United States Patent
Park et al.

(10) Patent No.: US 10,885,467 B2
(45) Date of Patent: Jan. 5, 2021

(54) DIFFERENTIALLY PRIVATE ITERATIVELY REWEIGHTED LEAST SQUARES

(71) Applicant: QUALCOMM Incorporated, San Diego, CA (US)

(72) Inventors: Mijung Park, Amsterdam (NL); Max Welling, Bussum (NL)

(73) Assignee: Qualcomm Incorporated, San Diego, CA (US)

(*) Notice: Subject to any disclaimer, the term of this patent is extended or adjusted under 35 U.S.C. 154(b) by 909 days.

(21) Appl. No.: 15/499,454

(22) Filed: Apr. 27, 2017

(65) Prior Publication Data

US 2017/0316346 A1 Nov. 2, 2017

Related U.S. Application Data

(60) Provisional application No. 62/329,186, filed on Apr. 28, 2016.

(51) Int. Cl.
| | |
|---|---|
| *G06F 21/62* | (2013.01) |
| *G06N 20/00* | (2019.01) |
| *G06F 17/11* | (2006.01) |
| *G06F 17/00* | (2019.01) |
| *G06N 3/063* | (2006.01) |

(52) U.S. Cl.
CPC .............. *G06N 20/00* (2019.01); *G06F 17/00* (2013.01); *G06F 17/11* (2013.01); *G06F 21/6245* (2013.01); *G06F 21/6254* (2013.01); *G06F 21/6263* (2013.01); *G06N 3/063* (2013.01)

(58) Field of Classification Search
CPC ............. G06F 21/6245; G06F 21/6254; G06F 21/6263
See application file for complete search history.

(56) References Cited

U.S. PATENT DOCUMENTS

| | | | |
|---|---|---|---|
| 8,619,984 B2 | 12/2013 | McSherry et al. | |
| 2004/0041944 A1* | 3/2004 | Matsumoto | H04N 7/0355 348/465 |
| 2008/0209568 A1* | 8/2008 | Chang | G06F 21/6245 726/26 |
| 2010/0162402 A1* | 6/2010 | Rachlin | G06F 21/60 726/26 |
| 2013/0099841 A1* | 4/2013 | Kodama | H03K 5/1252 327/205 |
| 2014/0137260 A1 | 5/2014 | Wang et al. | |
| 2014/0283091 A1 | 9/2014 | Zhang et al. | |
| 2015/0339493 A1 | 11/2015 | Ioannidis et al. | |
| 2016/0210463 A1* | 7/2016 | Fawaz | G06F 21/604 |

(Continued)

OTHER PUBLICATIONS

Senavirathne et al., "Approximating Robust Linear Regression With an Integral Privacy Guarantee", 10 pages (Year: 2018).*

(Continued)

*Primary Examiner* — Thaddeus J Plecha
(74) *Attorney, Agent, or Firm* — Seyfarth Shaw LLP (57) ABSTRACT

A method for privatizing an iteratively reweighted least squares (IRLS) solution includes perturbing a first moment of a dataset by adding noise and perturbing a second moment of the dataset by adding noise. The method also includes obtaining the IRLS solution based on the perturbed first moment and the perturbed second moment. The method further includes generating a differentially private output based on the IRLS solution.

23 Claims, 4 Drawing Sheets

(56) References Cited

U.S. PATENT DOCUMENTS

| | | | | |
|---|---|---|---|---|
| 2016/0335455 | A1* | 11/2016 | Mohan | G06F 21/6254 |
| 2016/0373222 | A1* | 12/2016 | Pralea | H04L 27/2636 |
| 2017/0293892 | A1* | 10/2017 | Kenthapadi | G06Q 50/01 |
| 2017/0293993 | A1* | 10/2017 | Achalla | G05B 23/0272 |
| 2018/0322309 | A1* | 11/2018 | Matejka | G06F 17/18 |
| 2018/0324693 | A1* | 11/2018 | Yu | H04W 76/28 |
| 2019/0236306 | A1* | 8/2019 | Ding | G06F 21/6245 |

OTHER PUBLICATIONS

Sheffet, "Differentially Private Ordinary Least Squares", 10 pages (Year: 2017).*

Dwork C., et al., "Concentrated differential privacy," Data Structures and Algorithms, arXiv preprint arXiv:1603.01887, 2016, pp. 1-28.

Imtiaz H., et al., "Symmetric Matrix Perturbation for Differentially-Private Principal Component Analysis," IEEE International Conference on Acoustics, Speech and Signal Processing (ICASSP), 2016, pp. 2339-2343.

Lei J., "Differentially Private M-Estimators," Advances in Neural Information Processing Systems, 2011, pp. 1-9.

Park M., "A Note on Privacy Preserving Iteratively Reweighted Least Squares", Computer Science, Cryptography and Security, May 24, 2016, pp. 1-5.

Chartrand R., et al., "Iteratively Reweighted Algorithms for Compressive Sensing," Acoustics, Speech and Signal Processing, 2008, ICASSP 2008, IEEE International Conference on, IEEE, Piscataway, NJ, USA, Mar. 31, 2008 (Mar. 31, 2008), pp. 3869-3872, XP031440487, ISBN: 978-1-4244-1483-3.

Dwork C., et al., "The Algorithmic Foundations of Differential Privacy," Foundations and Trends in TheoretiCal Computer Science, Jan. 1, 2013 (Jan. 1, 2013), vol. 9, No. 3-4, pp. 211-407, XP055390342, US ISSN: 1551-305X, DOI: 10.1561/0400000042.

International Search Report and Written Opinion—PCT/US2017/030123—ISA/EPO—dated Aug. 4, 2017.

Park M., et al., "A Note on Privacy Preserving Iteratively Reweighted Least Squares," arxiv.org, Cornell University Library, 2010 LIN Library Cornell University Ithaca, NY 14853, May 24, 2016 (May 24, 2016), XP080703328, 5 pages.

Sheffet O, "Differentially Private Ordinary Least Squares: t-Values, Confidence Intervals and Rejecting Null-Hypotheses," Jul. 9, 2015 (Jul. 9, 2015), XP055391996, Retrieved from the Internet: URL:https://arxiv.org/pdf/1507.02482.pdf, 14 pages.

* cited by examiner

DIFFERENTIALLY PRIVATE ITERATIVELY REWEIGHTED LEAST SQUARES

CROSS-REFERENCE TO RELATED APPLICATION

The present application claims the benefit of U.S. Provisional Patent Application No. 62/329,186, filed on Apr. 28, 2016, and titled "Differentially Private Iteratively Reweighted Least Squares," the disclosure of which is expressly incorporated by reference herein in its entirety.

BACKGROUND

Field

Certain aspects of the present disclosure generally relate to machine learning and, more particularly, to improving systems and methods of modifying an iteratively reweighted least squares solution to be differentially private.

Background

With the increased storage capacity of storage devices, a large amount of personal information may be stored in databases. As an example, the personal information may be information provided to social networks, hospitals, and/or financial institutions. Privacy is a concern when storing an individual's personal information. A breach of the stored information may present legal issues as well as cause consumers to lose faith in a business.

In some cases, the privacy of the data is maintained by adding noise to the data and/or adding noise to results of operations performed on the data. Still, it is desirable to add the correct amount of noise to the data. Too much noise may distort the data in a way that prevents the data to be used in the intended manner. Too little noise may not add the level of privacy needed to prevent a data breach.

Differential privacy safeguards results of operations performed on a dataset by providing little evidence as to whether any given individual contributed to the data set. That is, differential privacy reduces the possibility of determining whether specific data was present or absent based on an output of the system. Moreover, differential privacy does not alter the data. Rather, differential privacy alters the results of operations performed on the data to safeguard personal information that may be inferred from results of the operation.

To safeguard stored personal information, differential privacy introduces noise to the results of an operation, such as a query, performed on the data to conceal an individual's personal information. In some cases, noise may be added to results of an operation using a distribution, such as a Laplace distribution.

Iteratively reweighted least squares (IRLS) is used in machine learning to estimate parameters in generalized linear models. For example, iteratively reweighted least squares may be used for L-1 minimization. Iteratively reweighted least squares may also be used to maintain the sensitivity (e.g., privacy) of data. When privacy is a concern for sensitive data, conventional systems do not modify iteratively reweighted least squares to maintain the privacy of the data. Some systems use a privacy preserving M-estimator framework with perturbed histograms. The histogram based approach may not be extendable for high-dimensional parameter settings. It would be desirable to privatize an iteratively reweighted least squares solution.

SUMMARY

In one aspect of the present disclosure, a method for privatizing an iteratively reweighted least squares (IRLS) solution is disclosed. The method includes perturbing a first moment of a dataset by adding noise. The method also includes perturbing a second moment of the dataset by adding noise. The method further includes obtaining the IRLS solution based on the perturbed first moment and the perturbed second moment. The method still further includes generating a differentially private output based on the IRLS solution.

Another aspect of the present disclosure is directed to an apparatus including means for perturbing a first moment of a dataset by adding noise. The apparatus also includes means for perturbing a second moment of the dataset by adding noise. The apparatus further includes means for obtaining the IRLS solution based on the perturbed first moment and the perturbed second moment. The apparatus still further includes means for generating a differentially private output based on the IRLS solution.

In another aspect of the present disclosure, a non-transitory computer-readable medium with program code recorded thereon is disclosed. The program code for privatizing an IRLS solution is executed by a processor and includes program code to perturb a first moment of a dataset by adding noise. The program code also includes program code to perturb a second moment of the dataset by adding noise. The program code further includes program code to obtain the IRLS solution based on the perturbed first moment and the perturbed second moment. The program code still further includes program code to generate a differentially private output based on the IRLS solution.

Another aspect of the present disclosure is directed to an apparatus for privatizing an IRLS solution, the apparatus having a memory unit and one or more processors coupled to the memory unit. The processor(s) is configured to perturb a first moment of a dataset by adding noise. The processor(s) is also configured to perturb a second moment of the dataset by adding noise. The processor(s) is further configured to obtain the IRLS solution based on the perturbed first moment and the perturbed second moment. The processor(s) is still further configured to generate a differentially private output based on the IRLS solution.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Aspects of the present disclosure are directed to modifying iteratively reweighted least squares to be differentially private. In one configuration, the moments that appear in iteratively reweighted least squares are perturbed by adding noise. The noise level may be determined by a pre-chosen privacy budget. Furthermore, in one configuration, a concentrated differential privacy solution is specified to improve estimates with less of data in comparison to the conventional composition of differentially private mechanisms. Aspects of the present disclosure may be used in machine learning to modify an iteratively reweighted least squares solution to be differentially private, thus alleviating privacy concerns.

In one configuration, moments of an iteratively reweighted least squares iteration are perturbed by adding noise. The noise level may be determined by a privacy budget that is based on the amount of information that may be revealed. In each iteration, the iteratively reweighted least squares solution determines a first and second moment of the data. In this configuration, the first moment is the mean of the data and the second moment is the covariance of the data. Each moment is perturbed using a noise mechanism, such as Laplace or Wishart. In another configuration, a concentrated differential privacy solution is proposed.

As discussed above, the outcome of a solution, such as the iteratively reweighted least squares solution, is privatized such that individual information that is inherent in the dataset cannot be inferred. Privatizing the outcome of a solution may be more secure than privatizing data. For example, when privatizing data, such as generating a synopsis of a dataset using a private algorithm, the privatized data may be used in any standard solution for further analysis. That is, the solution may not work with the original data. Rather, the solution may work with the privatized data. In contrast, aspects of the present disclosure use the original data and modify the solution, such as the iteratively reweighted least squares solution, so the output is differentially private.

Figure 1:
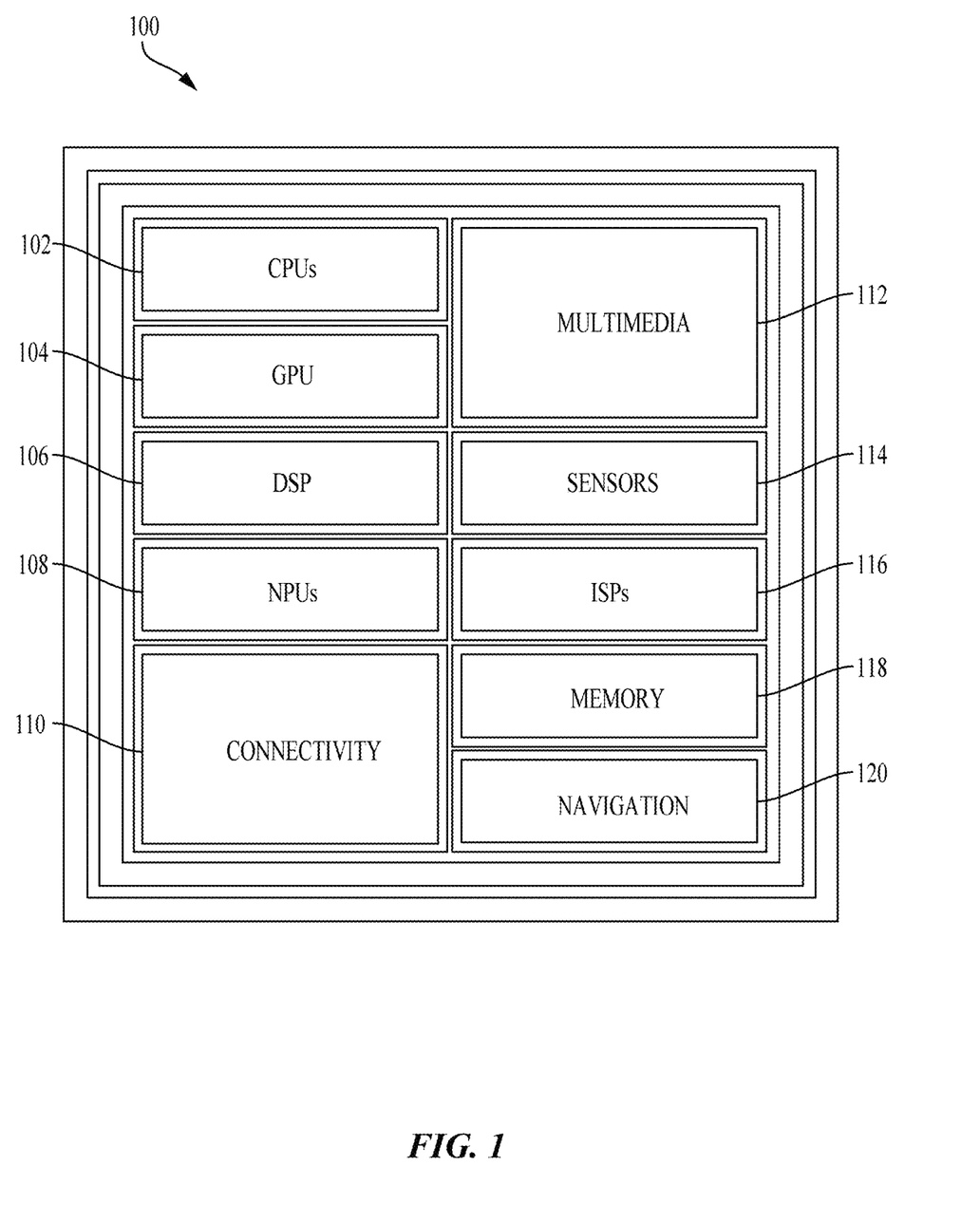
FIG. 1 illustrates an example implementation of modifying iteratively reweighted least squares to be differentially private using a system-on-a-chip (SOC), including a general-purpose processor in accordance with certain aspects of the present disclosure.

FIG. 1 illustrates an example implementation of the aforementioned differential private iteratively reweighted least squares solution using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, 5G connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation 120, which may include a global positioning system.

The SOC 100 may be based on an advanced RISC machine (ARM) instruction set. In an aspect of the present disclosure, the instructions loaded into the general-purpose processor 102 may comprise code for perturbing a first moment of a dataset by adding noise. The instructions loaded into the general-purpose processor 102 may also comprise code for perturbing a second moment of the dataset by adding noise. The instructions loaded into the general-purpose processor 102 may further comprise code for obtaining an iteratively reweighted least squares (IRLS) solution based on the perturbed first moment and the perturbed second moment. The instructions loaded into the general-purpose processor 102 may also comprise code for generating a differentially private output based on the IRLS solution.

Figure 2:
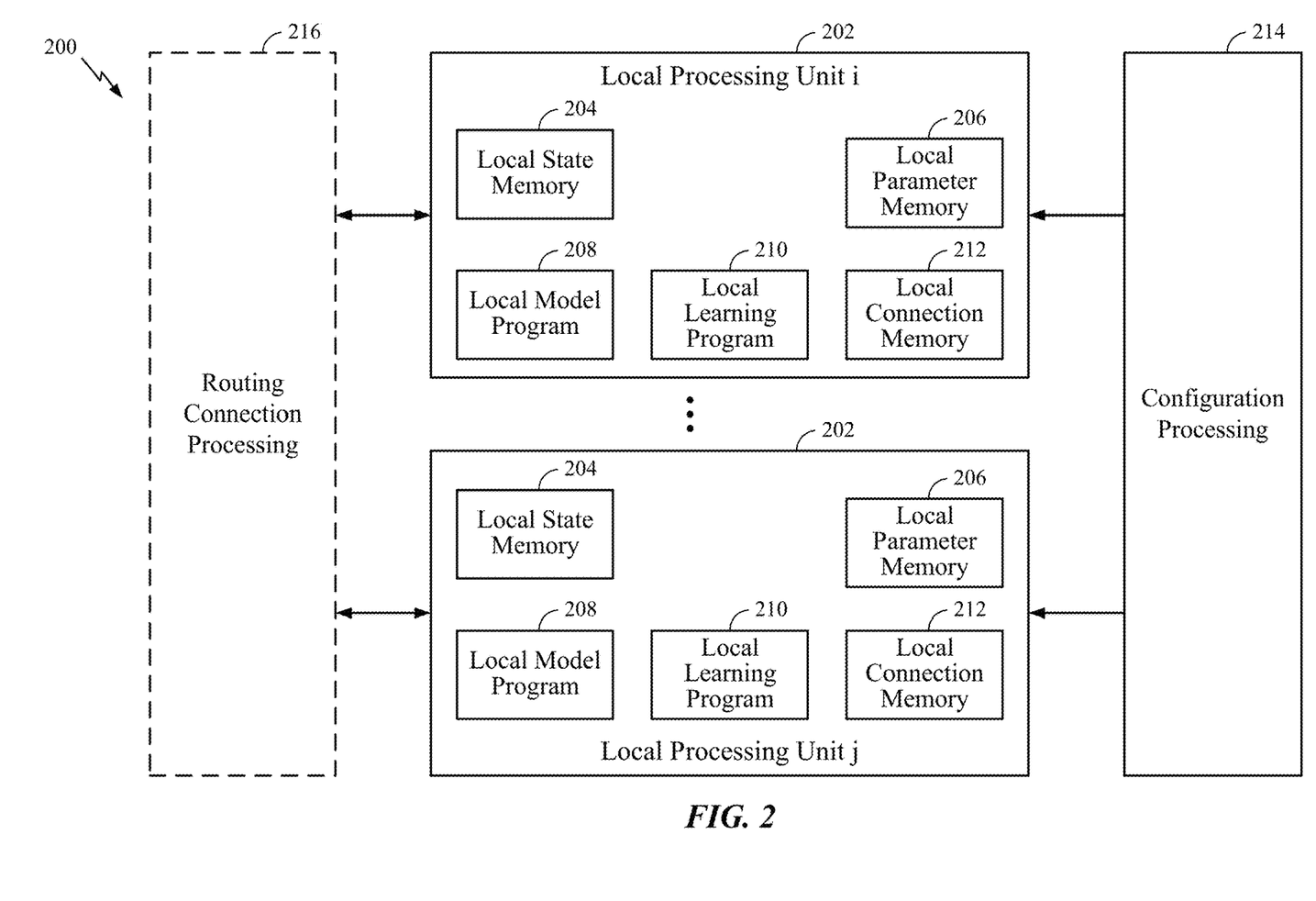
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

In one configuration, a processing model is configured to perturb a first moment of a dataset and a second moment of the dataset by adding noise. The model is also configured to obtain an iteratively reweighted least squares solution (IRLS) based on the perturbed first moment and the perturbed second moment. The model is further configured to generate a differentially private output based on the IRLS solution. The model includes a perturbing means, obtaining means, and/or generating means. In one configuration, the perturbing means, obtaining means, and/or generating means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

Differentially Private Iteratively Reweighted Least Squares

The iteratively reweighted least squares (IRLS) process is used in machine learning and signal processing to estimate the parameters in generalized linear models. For example, iteratively reweighted least squares can be used for L-1 minimization, which appears in compressed sensing literature known to those of skill in the art. When using privacy sensitive data, conventional systems do not modify iteratively reweighted least squares solutions to maintain the privacy of the privacy sensitive data. That is, iteratively reweighted least squares solutions are not inherently differentially private. In some cases, a privacy preserving M-estimator framework using perturbed histograms maintains the privacy of the privacy sensitive data. However, the histogram-based approach is not extendable for high-dimensional parameter settings.

Aspects of the present disclosure are directed to differentially private iteratively reweighted least squares solutions. In one configuration, moments that appear in the iteratively reweighted least squares iterations are perturbed by adding noise, where the noise level is determined by a pre-determined privacy value (e.g., budget). Aspects of the present disclosure do not use restrictive assumptions and can be extended to high-dimensional settings. In addition, a concentrated differential privacy solution may be specified to improve the accuracy of estimates with less data.

Differentially Private Iteratively Reweighted Least Squares

Given a dataset including N input-output pairs $\{x_i, y_i\}_{i=1}^{N}$, it is assumed that $\|x_i\|_2^2 \leq 1$ and $\|y_i\|_2^2 \leq 1$. The iteratively reweighted least squares solution has the form:

$$\theta_{iris}^{(t)} = (X^T S X)^{-1} (X^T S y) := B^{-1} A \qquad (1)$$

where $X \in R^{N \times d}$ is a design matrix in which the i-th row is the transposed i-th input $x^T$ (of length d), and y is a column vector of outputs. $R^{N \times d}$ is the size of the matrix X. That is, the matrix has N rows and d columns. From EQUATION 1, B is denoted as $$B = \frac{1}{N} X^T S X$$

and A is denoted as $$A = \frac{1}{N} X^T S y.$$

In EQUATION 1, A is a first moment and B is a second moment. In one configuration, the first moment is a mean from the dataset and the second moment is a covariance of the dataset. Furthermore, S is a diagonal matrix with diagonal $s = |y - X\theta^{(t-1)}|^{p-2}$. Finally, p is set to 1 and the system computes L1 norm constrained least squares. To avoid dividing by zero, the following is set:

$$s_i = \frac{1}{\max(1/\delta, |y_i - X_i \theta^{(t-1)}|)} \qquad (2)$$

where $X_i$ is the i-th row. The parameter $\delta$ sets the sparsity (number of non-zero values) of the iteratively reweighted least squares solution. That is, $\delta$ sets the sparsity of $\theta_{iris}^{(t)}$ from EQUATION 1.

Each of the moments A and B may be perturbed by specific amounts, such that each moment (e.g., statistic) is $\epsilon/2$-differentially private (DP). Therefore, the least squares solution may be $\epsilon$-differentially private according to the composition theorem. Aspects of the present disclosure are not limited to iteratively reweighted least squares solutions and are also contemplated for privatizing other types of solutions.

According to another aspect of the present disclosure, differential privacy may be based on a composition theorem, where, $M_i:N^{|X|} \to R_i$ is an $(\epsilon_i, \delta_i)$-differentially private solution for $i \in [k]$. If $M_{[k]}:N^{|X|} \to \Pi_{i=1}^k R_i$, where $M_{[k]}(x):= (M_1(x), \ldots, M_k(x))$, then $M_{[k]}$ is $(\Sigma_{i=1}^k \epsilon_i, \Sigma_{i=1}^k \delta_i)$-differentially private. Accordingly, independent concatenation of the $(\epsilon, \delta)$-differentially private solution results in a linearly degrading differentially private solution (linear in the number of concatenations).

$\epsilon/2$-Differentially Private Moment a by Laplace Mechanism

In one configuration, a Laplace mechanism is specified to perturb a first moment A. In one example, the dataset may include data of patients in a hospital and the specific data point may be data for a specific patient. For the Laplace mechanism, the system quantifies the amount of change that may occur if one data point in the dataset is altered. That is, the system may alter one data point (e.g., one patient's data of all patient data). Furthermore, the system may perform a first query from the first dataset comprising unaltered data and a second query from the dataset comprising a perturbed data point. Additionally, the system compares the differences in the query results from the first query and the second query. The amount of change may quantify the amount of noise that may be added to a moment. The difference in query results based on the perturbed data point may be determined as follows:

$$\Delta A := \max_{D, \tilde{D} \in N^{|X|}, \|D-\tilde{D}\|_1 = 1} \left\| \frac{1}{N} X^T S y - \frac{1}{N} \tilde{X}^T \tilde{S} \tilde{y} \right\|_1, \quad (3)$$

$$\leq \left\| \frac{1}{N} x_k s_k y_k^T - \frac{1}{N} \tilde{x}_k \tilde{s}_k \tilde{y}_k^T \right\|_1, \text{ suppose this quantity is maximised at index } k \quad (4)$$

$$\leq \frac{1}{N} \sum_{l=1}^d |x_{k,l} s_k y_k| + \frac{1}{N} \sum_{l=1}^d |\tilde{x}_{k,l} \tilde{s}_k \tilde{y}_k|, \text{ triangle inequality}$$

$$\leq \frac{1}{N} |y_k| \sum_{l=1}^d |s_k x_{k,l}| + \frac{1}{N} |\tilde{y}_k| \sum_{l=1}^d |\tilde{s}_k \tilde{x}_{k,l}|,$$

$$\leq \frac{s_k}{N} \sum_{l=1}^d |x_{k,l}| + \frac{\tilde{s}_k}{N} \sum_{l=1}^d |\tilde{x}_{k,l}|, \text{ because } |y_{k'}| \leq 1 \text{ and } |\tilde{y}_k| \leq 1,$$

$$\leq \frac{2\delta \sqrt{d}}{N}, \text{ because } s_k \leq \delta.$$

where $\Delta A$ refers to the difference in query results for the data point from the first query and the second query. $x_k$ is the k-th input, $y_k$ is the k-th output, $s_k$ is the k-th diagonal entry of the matrix x, and $x_{k,l}$ is the k-th input at the l-th coordinate. $\tilde{x}_k$, $\tilde{x}_{k,l}$, $\tilde{s}_k$, and $\tilde{y}_k$ are the perturbed versions of $x_k$, $y_k$, $s_k$, and $x_{k,l}$. The maximum difference in query results may be bounded in EQUATION 4. Furthermore, an amount of noise may be added to the first moment A to compensate for the difference. Therefore, the following Laplace mechanism produces $\epsilon/2$-differentially private moment of A:

$$\tilde{A} = A + (Y_1, \ldots, Y_d), \quad (5)$$

where $$Y_i : ^{i.i.d.} Laplace\left(\frac{2\delta \sqrt{d}/N}{\epsilon/2}\right) = Laplace\left(\frac{4\delta \sqrt{d}}{N\epsilon}\right).$$

$\tilde{A}$ refers to the first moment A that includes the added noise.

$\epsilon/2$-Differentially Private Moment B

Furthermore, in one configuration, a second moment B is perturbed by adding Wishart noise such that the perturbed matrix is still symmetric and positive definite. To draw Wishart noise, Gaussian random variables are drawn:

$$z_i : N\left(0, \frac{\delta}{\epsilon N} I_d\right), \text{ for } i = \{1, \ldots, d+1\}, \quad (6)$$

to construct a matrix $Z:=[z_1, \ldots, z_{d+1}] \in R^{d \times (d+1)}$ $$\tilde{B} := B + ZZ^T \quad (7)$$

where $\tilde{B}$ is a $\epsilon/2$-differentially private second moment matrix and $I_d$ is an identity matrix having a size of d by d. That is, $\tilde{B}$ is the second moment B with added noise.

The matrix $ZZ^T$ is a sample from a Wishart distribution $$W\left(ZZ^T \mid \frac{\delta}{\epsilon N} I_d, d+1\right)$$

with covariance $$\frac{\delta}{\epsilon N} I_d$$

and degree of freedom d+1. A noised version $\tilde{B}$ evaluated at B (or evaluated at B') follows the Wishart distribution. Thus, the ratio:

$$\frac{W\left(\tilde{B} - B \mid \frac{\delta}{\epsilon N} I_d, d+1\right)}{W\left(\tilde{B} - B' \mid \frac{\delta}{\epsilon N} I_d, d+1\right)} = \frac{\exp\left(-\frac{\epsilon N}{2\delta} tr(\tilde{B} - B)\right)}{\exp\left(-\frac{\epsilon N}{2\delta} tr(\tilde{B} - B')\right)}, \quad (8)$$

$$= \exp\left(\frac{\epsilon N}{2\delta} tr(B - B')\right), \quad (9)$$

$$= \exp\left(\frac{\epsilon N}{2\delta} \frac{1}{N} tr(s_k x_k x_k^T - \tilde{s}_k \tilde{x}_k \tilde{x}_k^T)\right), \quad (10)$$

$$= \exp\left(\frac{\epsilon}{2\delta} (s_k x_k^T x_k - \tilde{s}_k \tilde{x}_k^T \tilde{x}_k)\right), \quad (11)$$

$$\leq \exp\left(\frac{\epsilon}{2}\right), \text{ since } 0 \leq x_k^T x_k \leq 1,$$

and $0 \leq s_k \leq \delta$.

According to the composition theorem, by concatenating the independent perturbations on each moment, a $\epsilon$-DP iteratively reweighted least squares solution is obtained as presented below, where a dataset D is provided to obtain an $\epsilon$-iteratively reweighted differential privacy least squares solution after J iteration(s):

(1) Compute the moment $$A = \frac{1}{N} X^T y$$

and add Laplace noise $Y_i$ to each coordinate of the moment, $\tilde{A} := A + (Y_1, \ldots, Y_d)$, where $$Y_i :^{i.i.d.} Lap\left(\frac{4\delta\sqrt{d}\,J}{N\varepsilon}\right),$$

(2) Compute the moment $$B = \frac{1}{N}X^T X$$

and add Wishart noise $Y_i$ to coordinate the moment, $\tilde{B}:=B+ZZ^T$, where $Z:=[z_1, \ldots, z_{d+1}]\in R^{d\times(d+1)}$ and $$z_i : N\left(0, \frac{\delta J}{\varepsilon N}I_d\right),$$

(3) Compute the $\epsilon$-DP iteratively reweighted least squares solution by $\theta_{dpirls}:=\tilde{B}^{-1}\tilde{A}$. That is, $\tilde{B}^{-1}\tilde{A}$ replace the A and B from EQUATION 1 to compute the $\epsilon$-DP iteratively reweighted least squares solution Concentrated Differential Privacy According to an aspect of the present disclosure, concentrated differential privacy (CDP) reduces the amount of noise to add to the moments without compromising on cumulative privacy loss over several iterations.

As is known to those of skill in the art, a $\epsilon$-differential privacy solution may be expressed as a $(\epsilon(\exp(\epsilon)-1)/2,\epsilon)$-concentrated differential privacy (CDP) solution. The equation $\epsilon(\exp(\epsilon)-1)/2,\epsilon$ refers to the expected privacy loss approximated by $\epsilon^2$. Furthermore, as is known to those of skill in the art, the J-composition of a $(\mu,\tau)$-CDP mechanism guarantees $(\Sigma_{i=1}^J \mu_i, \sqrt{\Sigma_{i=1}^J \tau_i^2})$-CDP. In one configuration, one or more key statistic(s) in each iteratively reweighted least squares iteration is perturbed using the Laplace mechanism. In one configuration, the key statistic is referred to as a moment. $\mu$ and $\tau$ are concentrated differential privacy parameters, where $\mu$ is the average privacy loss and $\tau$ is a standard deviation opf the privacy loss. The difference in statistics given dataset x and y may be represented as $\Delta S:=S(x)-S(y)$. According to the conventional composition theorem, I is added to $Lap(\Delta SJ/\epsilon)$ in each iteration to specify $\epsilon$-DP after J iterations. I is an identity matrix and $\epsilon'$ is a per-iteration privacy loss. Additionally, the key statistic in each iteration may be perturbed by adding Laplace noise drawn from $Lap(\Delta S/\epsilon')$, which, as is known to those of skill in the art, results in a $(\epsilon'(\exp(\epsilon')-1)/2,\epsilon')$-CDP solution. Furthermore, as is known to those of skill in the art, after J iterations, a $(J\epsilon'(\exp(\epsilon')-1)/2,\sqrt{J}\epsilon')$-CDP solution may be obtained. It is desirable for the expected privacy loss to equal the privacy budget (e.g., $J\epsilon'(\exp(\epsilon')-1)/2=\epsilon$). Using Taylor's expansion, $J\epsilon'(\exp(\epsilon')-1)/2$ may be re-written as $$J\varepsilon'\left(1+\varepsilon'+\sum_{j=2}^{\infty}\frac{\varepsilon'^j}{j!}-1\right)/2 = \varepsilon,$$

which may be lower bound by ignoring the infinite sum, $J\epsilon'^2/2\le\epsilon$. Thus, the largest $\epsilon'$ should be less than or equal to $\sqrt{2\epsilon/J}$.

The key statistic may be perturbed by adding Laplace noise drawn from $Lap(\sqrt{J}\Delta S/\sqrt{2\epsilon})$, to obtain a $(\epsilon, \sqrt{2\epsilon})$-CDP solution after J iterations.

In the iteratively reweighted least squares solution, two moments (e.g., statistics) are perturbed in each iteration. That is, each moment may be perturbed to obtain $\epsilon'$-DP. Furthermore, the result may be modified by replacing J with 2J for the iteratively reweighted least squares solution. Therefore, each perturbation may result in $\epsilon'$-DP parameters, where $$\varepsilon' := \sqrt{\frac{2\varepsilon}{2J}} = \sqrt{\frac{\varepsilon}{J}},$$

resulting in the $\epsilon$-CDP iteratively reweighted least squares solution. The $(\epsilon, \sqrt{2\epsilon})$-CDP iteratively reweighted least squares solution via moment perturbation, given a dataset D to obtain a $\epsilon$-iteratively reweighted least squares solution after J iteration(s), is as follows:

(1) Compute the moment $$A = \frac{1}{N}X^T y$$

and add either Laplace or Gaussian noise $Y_i$ to each coordinate of the moment, $\tilde{A}:=A+(Y_1, \ldots, Y_d)$, where $$Y_i :^{i.i.d.} Lap\left(\frac{2\delta\sqrt{d}\,\sqrt{J}}{N\sqrt{\varepsilon}}\right),$$

(2) Compute the moment $$B = \frac{1}{N}X^T X$$

and add Gaussian noise $Y_i$ to each coordinate of the moment, $\tilde{B}:=B+ZZ^T$, where $Z:=[z_1, \ldots, z_{d+1}]\in R^{d\times(d+1)}$ and $$z_i : N\left(0, \frac{2\delta\sqrt{J}}{N\sqrt{\varepsilon}}I_d\right),$$

(3) Compute the $\epsilon$-CDP iteratively reweighted least squares solution by $\theta_{dpirls}:=\tilde{B}^{-1}\tilde{A}$.

According to aspects of the present disclosure, differential privacy may be based on a Laplace mechanism. Given a function $f:N^{|X|}\rightarrow R^k$, the Laplace mechanism is defined by:

$$M(x,f(\cdot),\epsilon)=f(x)+(Y_1, \ldots, Y_k), \quad (12)$$

where $Y_i :^{i.i.d} Laplace(\Delta f/\epsilon)$. That is, adding the Laplace noise to each coordinate of $f(x)$ results in the $(\epsilon, 0)$-DP solution. Here, $\Delta f$ refers $l_1$-sensitivity of a function f, which is defined as:

$$\Delta f = \max_{x,y\in N^{|X|}, \|x-y\|_1=1} \|f(x)-f(y)\|_1. \quad (13)$$

As previously discussed, aspects of the present disclosure may privatize results of an operation performed on a dataset. In some cases, a data provider may be requested to provide data to an artificial neural network for a task, such as machine learning. The data provider may be hesitant to provide the data due to privacy concerns. Still, to alleviate the data providers privacy concerns, results of an operation, such as the iteratively reweighted least squares solution, may be differentially privatized according to aspects of the present disclosure.

Figure 3:
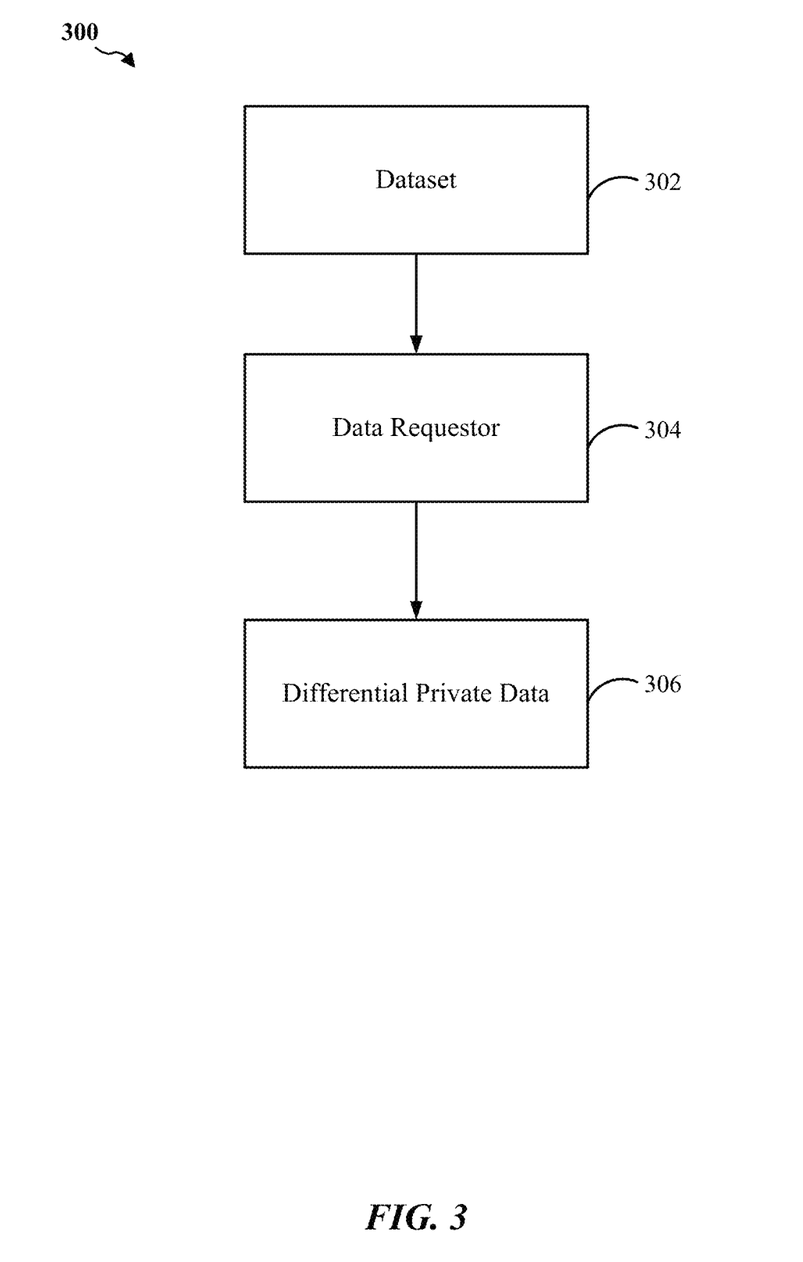
FIG. 3 illustrates an example of a modified iteratively reweighted least squares solution to be differentially private according to an aspect of the present disclosure.

FIG. 3 illustrates a flow diagram 300 for differentially privatizing the iteratively reweighted least squares solution according to aspects of the present disclosure. As shown in FIG. 3, a dataset 302 (e.g., dataset which consist of N input-output pairs) is provided to a data requestor 304, such as an artificial neural network, a computer, and/or a signal processor. In this example, the data requestor 304 uses iteratively reweighted least squares to estimate the parameters in generalized linear models or non-linear models. For example, the data requestor may use the iteratively reweighted least squares for linear or nonlinear least squares solutions (e.g., iteratively reweighted least squares, Gauss-Newton solutions). Of course, aspects of the present disclosure are not limited to the aforementioned uses of iteratively reweighted least squares and are contemplated for any use of an iteratively reweighted least squares solution and/or other functions (e.g., solutions).

Upon receiving the dataset, the privacy engine perturbs a first moment A from the dataset 302. The first moment A may be perturbed with a Laplace mechanism. That is, the Laplace mechanism produces a $\epsilon/2$-differentially private moment of A. In one configuration, the $\epsilon/2$-differentially private moment of A is referred to as Ã. The data requestor 304 also perturbs a second moment B from the dataset 302. The second moment B may be perturbed by adding Wishart noise. That is, noise is added to the second moment B to obtain a $\epsilon/2$-differentially private moment B̃.

After perturbing the moments A and B, the data requestor 304 obtains an iteratively reweighted least squares solution based on the perturbed first data point and the perturbed second data point. In one configuration, the iteratively reweighted least squares solution is a differential private iteratively reweighted least squares function. In another configuration, the iteratively reweighted least squares solution is a concentrated differential private iteratively reweighted least squares function. According to one aspect of the present disclosure, when the additive noise level under a differential private iteratively reweighted least squares function is greater than a threshold, the resulting estimator becomes too noisy. Therefore, the concentrated differential private iteratively reweighted least squares function is used when the additive noise level under a differential private iteratively reweighted least squares function is greater than a threshold. The additive noise level under a concentrated differential private iteratively reweighted least squares function is less than the additive noise level under a differential private iteratively reweighted least squares function, for the same level of privacy.

As shown in FIG. 3, the data requestor 304 outputs differential private data 306 using the differential private iteratively reweighted least squares solution. Aspects of the present disclosure privatize the outcome of the iteratively reweighted least squares solution such that individual information cannot be inferred from the dataset. That is, as shown in FIG. 3, the dataset 302 is used in a modified solution, such as a differential private iteratively reweighted least squares function or a concentrated differential private iteratively reweighted least squares function, to generate a differentially private output of the modified solution.

Figure 4:
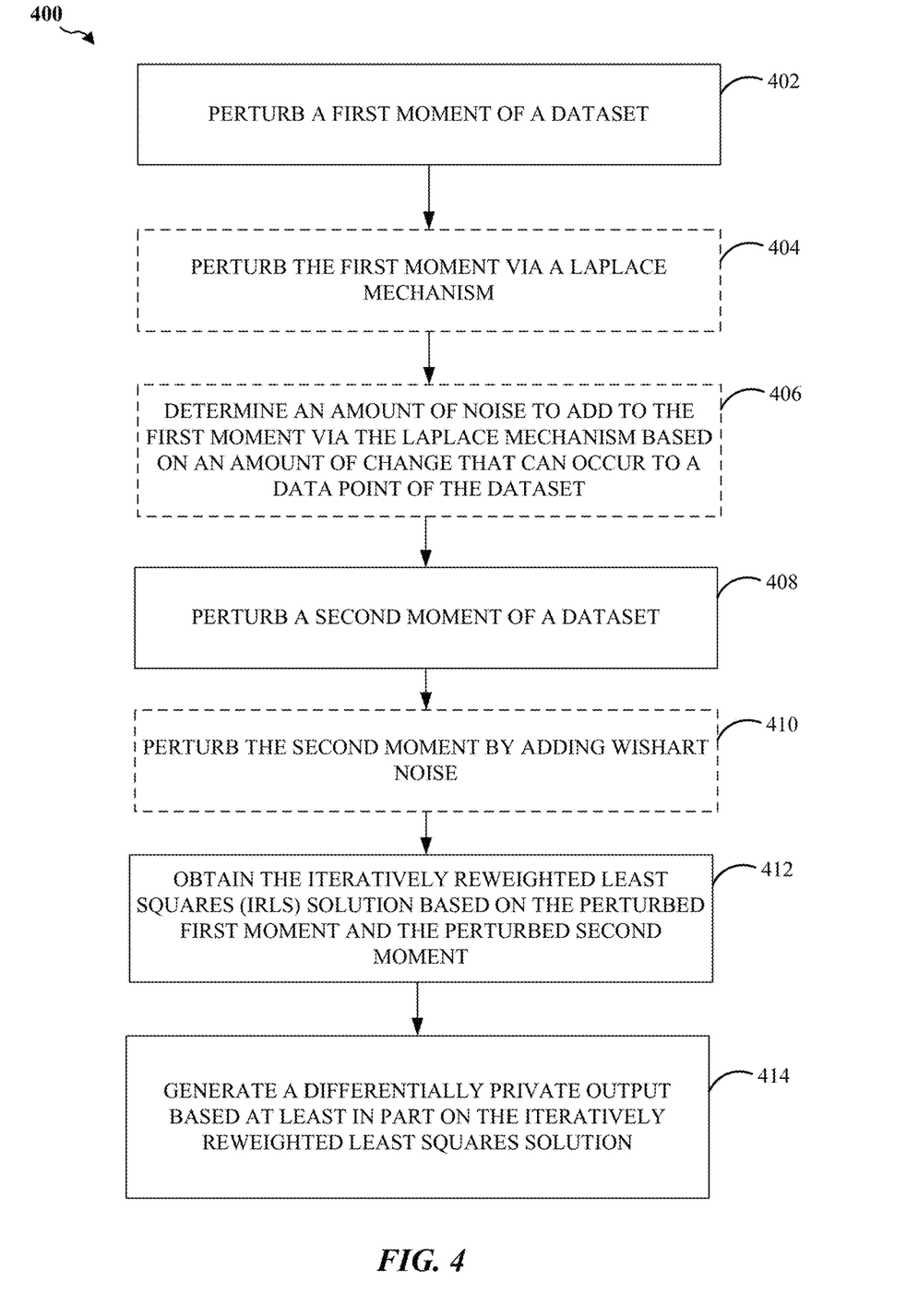
FIG. 4 illustrates a flow diagram for modifying iteratively reweighted least squares to be differentially private according to an aspect of the present disclosure.

FIG. 4 illustrates an example of a method 400 for privatizing an iteratively reweighted least squares (IRLS) solution. As shown in FIG. 4, at block 402 the process perturbs a first moment of a dataset by adding noise. For example, the dataset may be hospital patient records. In an optional configuration, at block 404, the first moment is perturbed via a Laplace mechanism. Additionally, in an optional configuration, at block 406, the process determines an amount of noise to add to the first moment via the Laplace mechanism based on an amount of change that can occur to a data point of the dataset.

Furthermore, in block 408, the process perturbs a second moment of the dataset by adding noise. In an optional configuration, at block 410, the second moment is perturbed by adding Wishart noise. In one configuration the first moment is a mean from the dataset and the second moment is a covariance of the dataset.

Additionally, in block 412, the process obtains the iteratively reweighted least squares solution based on the perturbed first moment and the perturbed second moment. In one configuration the iteratively reweighted least squares solution is a differential private (DP) iteratively reweighted least squares function. In another configuration, the iteratively reweighted least squares solution is a concentrated differential private (CDP) iteratively reweighted least squares function. At block 414, the process generates a differentially private output based on the iteratively reweighted least squares solution In some aspects, the method 400 may be performed by the SOC 100 (FIG. 1), the system 200 (FIG. 2), or the data requestor 304. That is, each of the elements of the method 400 may, for example, but without limitation, be performed by the SOC 100, the system 200 or one or more processors (e.g., CPU 102 and local processing unit 202), the data requestor 304, and/or other components included therein.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array (FPGA) signal or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method, comprising:
   receiving a dataset, at a data requestor, comprising a plurality of input-output pairs;
   perturbing, at the data requestor, a first moment of the dataset by adding noise;
   perturbing, at the data requestor, a second moment of the dataset by adding noise;
   obtaining, at the data requestor, a differential private (DP) iteratively reweighted least squares (IRLS) function based on the perturbed first moment and the perturbed second moment; and
   generating, at the data requestor, a differentially private output by applying the DP IRLS function to the dataset.

2. The method of claim 1, in which the first moment is a mean of the dataset and the second moment is a covariance of the dataset.

3. The method of claim 1, further comprising:
   perturbing the first moment via a Laplace mechanism; and
   perturbing the second moment by adding Wishart noise.

4. The method of claim 1, further comprising determining an amount of noise to add to the first moment via a Laplace mechanism based on an amount of change that can occur to a data point of the dataset.

5. The method of claim 1, in which the DP IRLS function is a concentrated differential private (CDP) iteratively reweighted least squares function.

6. The method of claim 1, in which the differentially private output comprises an L1 minimization solution.

7. An apparatus, comprising:
   a memory; and
   at least one processor coupled to the memory, the at least one processor configured:
      to receive a dataset, at a data requestor, comprising a plurality of input-output pairs;
      to perturb, at the data requestor, a first moment of the dataset by adding noise;
      to perturb, at the data requestor, a second moment of the dataset by adding noise;
      to obtain, at the data requestor, a differential private (DP) iteratively reweighted least squares (IRLS) function based on the perturbed first moment and the perturbed second moment; and
      to generate, at the data requestor, a differentially private output by applying the DP IRLS function to the dataset.

8. The apparatus of claim 7, in which the first moment is a mean of the dataset and the second moment is a covariance of the dataset.

9. The apparatus of claim 7, in which the at least one processor is further configured:
   to perturb the first moment via a Laplace mechanism; and
   to perturb the second moment by adding Wishart noise.

10. The apparatus of claim 7, in which the at least one processor is further configured to determine an amount of noise to add to the first moment via a Laplace mechanism based on an amount of change that can occur to a data point of the dataset.

11. The apparatus of claim 7, in which the DP IRLS function is a concentrated differential private (CDP) iteratively reweighted least squares function.

12. The apparatus of claim 7, in which the differentially private output comprises an L1 minimization solution.

13. An apparatus, comprising:
    means for receiving a dataset, at a data requestor, comprising a plurality of input-output pairs;
    means for perturbing, at the data requestor, a first moment of the dataset by adding noise;
    means for perturbing, at the data requestor, a second moment of the dataset by adding noise;
    means for obtaining, at the data requestor, a differential private (DP) iteratively reweighted least squares (IRLS) function based on the perturbed first moment and the perturbed second moment; and
    means for generating, at the data requestor, a differentially private output by applying the DP IRLS function to the dataset.

14. The apparatus of claim 13, in which the first moment is a mean of the dataset and the second moment is a covariance of the dataset.

15. The apparatus of claim 13, further comprising:
    means for perturbing the first moment via a Laplace mechanism; and means for perturbing the second moment by adding Wishart noise.

16. The apparatus of claim 13, further comprising means for determining an amount of noise to add to the first moment via a Laplace mechanism based on an amount of change that can occur to a data point of the dataset.

17. The apparatus of claim 13, in which the DP IRLS function solution is a concentrated differential private (CDP) iteratively reweighted least squares function.

18. The apparatus of claim 13, in which the differentially private output comprises an L1 minimization solution.

19. A non-transitory computer-readable medium having program code recorded thereon, the program code executed by a processor and comprising:
   program code to receive a dataset, at a data requestor, comprising a plurality of input-output pairs;
   program code to perturb, at the data requestor, a first moment of the dataset by adding noise;
   program code to perturb, at the data requestor, a second moment of the dataset by adding noise;
   program code to obtain, at the data requestor, a differential private (DP) iteratively reweighted least squares (IRLS) function based on the perturbed first moment and the perturbed second moment; and
   program code to generate, at the data requestor, a differentially private output by applying the DP IRLS function to the dataset.

20. The non-transitory computer-readable medium of claim 19, in which the first moment is a mean of the dataset and the second moment is a covariance of the dataset.

21. The non-transitory computer-readable medium of claim 19, further comprising:
   program code to perturb the first moment via a Laplace mechanism; and
   program code to perturb the second moment by adding Wishart noise.

22. The non-transitory computer-readable medium of claim 19, in which the program code to perturb the first moment further comprises program code to determine an amount of noise to add to the first moment via a Laplace mechanism based on an amount of change that can occur to a data point of the dataset.

23. The non-transitory computer-readable medium of claim 19, in which the DP IRLS function is a concentrated differential private (CDP) iteratively reweighted least squares function.

* * * * *